United States Patent [19]

Tripp

[11] Patent Number: 5,294,273
[45] Date of Patent: Mar. 15, 1994

[54] METHOD OF MAKING A COMPOSITE BELT FROM USED TIRES

[76] Inventor: Benjamin A. Tripp, R. R. #2, Orangeville, Ontario, Canada, L9W 2Y9

[21] Appl. No.: 25,787

[22] Filed: Mar. 3, 1993

[51] Int. Cl.$^5$ .......................... B32B 7/08; B32B 35/00
[52] U.S. Cl. ......................................... 156/91; 156/94; 156/95; 156/304.5
[58] Field of Search .................. 83/951; 156/91, 92, 156/93, 94, 137, 141, 304.3, 304.5, 502, 95; 428/903.3

[56] References Cited

U.S. PATENT DOCUMENTS

| | | | |
|---|---|---|---|
| 3,933,565 | 1/1976 | Printz et al. | 156/502 |
| 4,366,014 | 12/1982 | Pollard | 156/157 |
| 4,376,668 | 3/1983 | Ginter, Jr. et al. | |
| 5,096,772 | 3/1992 | Snyder | 152/535 |

FOREIGN PATENT DOCUMENTS 47-13318  4/1972  Japan .

*Primary Examiner*—Michael W. Ball
*Assistant Examiner*—Richard Crispino
*Attorney, Agent, or Firm*—Ridout & Maybee

[57] ABSTRACT

A composite belt of used vehicle tires having their sidewalls removed is obtained by joining individual belts in end to end relation by forming tapered belt ends which are overlapped and chemically bonded together. The overlapping of belt ends is accomplished so as to provide a high degree of strength to the joint enabling the composite belt to be used as a substrate for the further manufacture of rubber products.

6 Claims, 3 Drawing Sheets

METHOD OF MAKING A COMPOSITE BELT FROM USED TIRES

The invention is a method of joining tread carrying used vehicle tire belts in end to end relation and the manufacture of rubber products from the joined belts.

The disposal of used vehicle tires is a major ecological concern in developed countries. Considerable effort has gone into developing methods for recycling or reusing waste tires, but due largely to economic factors, the vast bulk of used tires are discarded in land fills or tire dumps where they may pose a considerable fire hazard.

Vehicle tires possess great strength due to the multiple plies of steel and high strength fiber material used in their construction. Heretofore it has not been economically possible to utilize the strength of used vehicle tires to manufacture other useful products principally because no effective means had been devised for joining pieces of used tire belt together to provide a material usable as a substrate for the further manufacture of products.

As used in this specification, the term "belt" means that portion of a vehicle tire excluding the sidewalls which has been severed transversely to provide an elongate strip. Tire belts used in the invention include the tire tread. The term "vehicle tire" means automobile and light truck tires. These tires as compared to heavy truck tires possess sufficient belt flexibility to be usable in the method of the invention.

The tire belts are joined in an end to end relation by tapering the belt ends and attaching the tapered end portions of two belts together in an overlapping arrangement using chemical bonding alone or in combination with mechanical fasteners. A plurality of belts joined together in accordance with the invention can be used to manufacture a variety of rubber products such as tubes and beams. The invention has particular application to the joining of a plurality of steel reinforced belts, wherein the steel reinforcing ply of one of the belts is oriented to strengthen the joint between two belts.

Accordingly, the invention provides a method for joining tire belts in end to end relation, where each belt is obtained by removing both sidewalls of a vehicle tire having reinforcing plies and severing the remaining annular portion transversely to provide an elongate belt having two ends, a tread surface and an inner surface. The method includes the steps of tapering the ends of two belts to be joined with the taper proceeding outwardly from the tread to the inner surface of each belt; removing a portion of the inner surface at a tapered end of one belt to provide a surface for overlapping the tapered end of the other belt; and joining the overlapping ends together by chemically bonding overlapping surfaces.

A significant problem hampering the widespread recycling of used vehicle tires is the difficulty in working with short strips of reinforced rubber which are not capable of being readily joined together. Prior methods for reusing tire parts have involved removal of the tire tread to provide a fresh surface for bonding agents so that essentially uniform tire pieces can be joined together to form a desired product. Unfortunately, it is the extensive processing of used tires in accordance with prior methods which makes such recycling efforts unattractive commercially.

Figure 1:
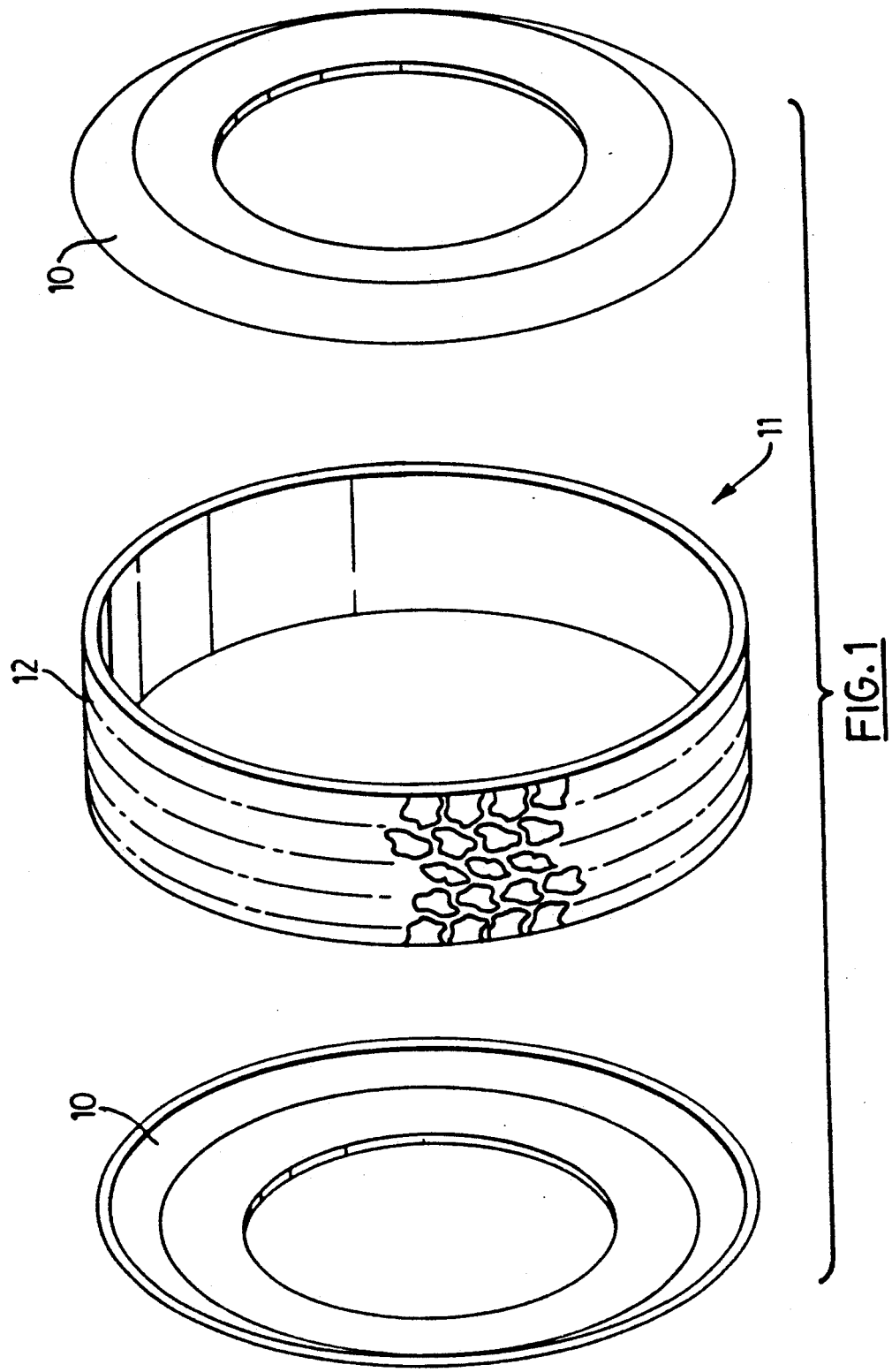
FIG. 1 is an exploded perspective view of a tire with sidewalls removed.
Figure 2:
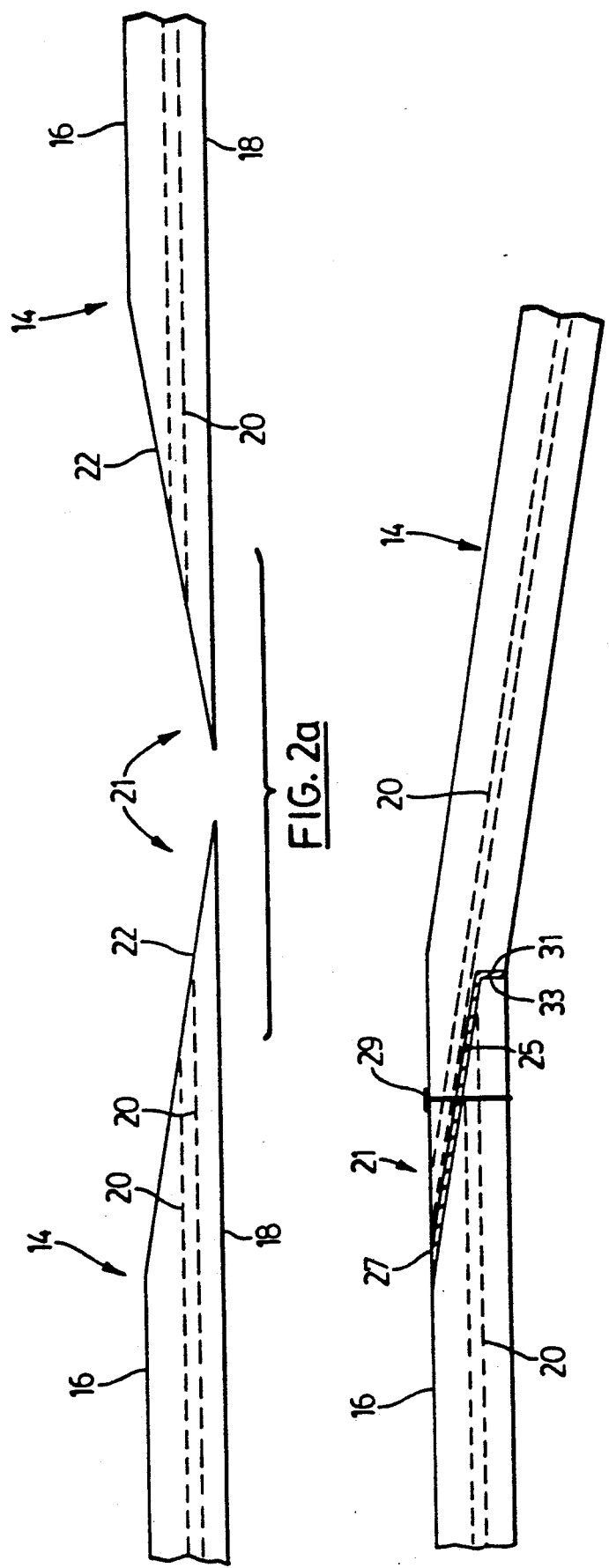
FIG. 2a is a side elevation of opposing tapered ends of two belts.
FIG. 2b is a side elevation of a preferred means for overlapping ends of two belts where the overlapping end has a portion of the inner surface removed.

In accordance with the present method, the tire tread is not removed, thereby avoiding a costly process step. As shown in FIG. 1, sidewalls 10 are removed, preferably by cutting, from a used vehicle tire 11 to give an annular tread bearing member 12 which is severed transversely to provide an elongate belt 14 (FIG. 2). Each belt 14 so formed has a tread surface 16 and an inner surface 18 with a plurality of reinforcing plies 20 embedded in the rubber between the tread 16 and inner surface 18. Preferably, the reinforcing plies 20 include one or more steel reinforcing ply.

As a first step in the joining of two belts 14 in end to end relation, the belt ends 21 are tapered outwardly starting from the tread surface 16 and proceeding to the inner surface 18 so that an outwardly declining surface or bevel 22 is formed at each belt end 21 (FIG. 2a). Since the reinforcing plies 20 are closer to the inner surface 18 than to the surface of the tread 16, belt ends 21 tapered in this fashion enable the reinforcing plies 20 to extend into the taper for most of its length.

While the two tapered belt ends 21 may be joined by chemically bonding the bevel surface 22 of one belt end 21 to the inner surface 18 of the other belt end 21, the inner surface 18 is not capable of readily forming a chemical bond unless it is first prepared by cleaning, scruffing or by removing some of the surface 18 itself.

Accordingly, the second step in the joining of two belts 14 in accordance with the invention is to remove a portion of the inner surface 18 at the tapered end 21 to be joined to a bevel surface 22 of another belt 14 so that a fresh surface 25 (FIG. 2b) is provided to allow an overlapping joint to be formed with the bevel surface 22 of the other belt end 21. Preferably, the two ends 21 are joined at their surfaces 22 and 25 using adhesive 27 or vulcanization. For added strength, mechanical fasteners, such as staples 29, can be included in the joint.

As shown in FIG. 2b, a preferred conformation of overlapping surfaces 22 and 25 is such that the overlapping belt end 21 has a portion of its inner surface 18 removed to near the innermost reinforcing ply 20, with the material removal preferably ending abruptly at a transversely extending abutting surface 31. The underlapping belt end 21 has a terminal portion removed to provide a complimentary transversely extending end surface 33 sized to abut the surface 31 of the overlapping belt end 21. This preferred joint, as shown in FIG. 2b, has the advantages of allowing easy alignment of the belts 14 being joined and the joint which is formed using adhesive or vulcanization is strengthened by virtue of the juxtapositioning of the innermost reinforcing ply 20 of the overlapping belt end 21 and the ends of the reinforcing plies 20 of the underlapping belt end 21. In the case of steel reinforcing plies 20, the strength of the joint approaches the strength of the belt 14 at a non-joint location.

The tensile load in the finished joined belt 14 is carried through the joint from the reinforcing plies 20 of one belt section 14 through the interface of the joint in shear to the reinforcing plies 20 of the other belt section 14. In this regard, the shear carrying capability of rubber is appropriate for the present application. The shear plane of the joint between two belt sections 14 involves the entire tapered ends 21, and thus, the strength of the finished joint may be varied by varying the length of the taper, i.e. the width of the bevel surface 22, which in turn varies the area of reinforcing ply 20 overlap and the area of rubber which carries the shear load.

An elongate belt 14 formed by joining a plurality of individual belt sections 14 in accordance with the invention may be used for the manufacture of a variety of useful rubber products. The composite belt 14 may have varying thicknesses due to different tread wear patterns, but this is of minor consequence as long as the joints are properly formed. Also, the joint itself will create a slight bend in the elongate composite belt 14 which is formed, but this bend is of no consequence since the belt 14 is very flexible across the minor dimension of its thickness.

Figure 3:
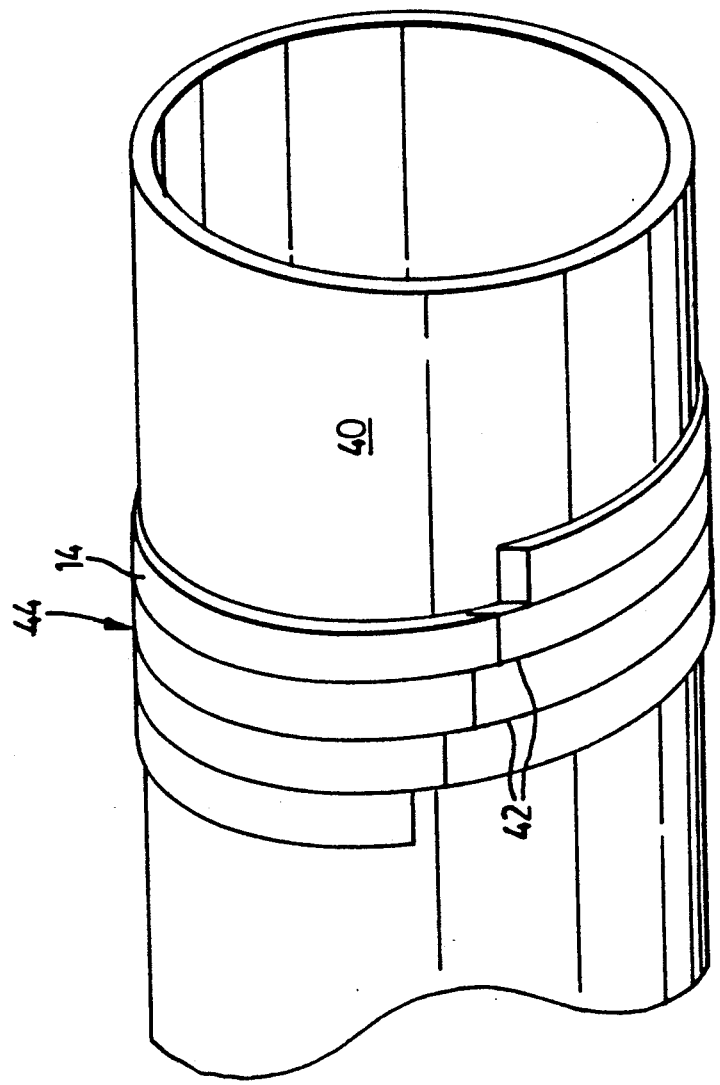
FIG. 3 is a perspective view showing a use of belts joined in accordance with the invention to form a tube.

As shown in FIG. 3, the composite belt 14 may be used for the production of products such as tubes. The belt 14 may be wound about a mandrel 40 and chemically bonded at abutting edge surfaces 42 to form a tube 44. Other uses for the composite belt 14 of the invention will be apparent to the skilled person.

While the foregoing has been a description of the preferred embodiments of the invention, the description is not intended to restrict the scope of protection afforded to the invention by the following claims.

I claim:

1. A method for joining a plurality of individual tire belts in end to end relation to form an elongate composite belt, the method comprising:

removing both sidewalls from used vehicle tires having reinforcing plies thereby forming annular tread bearing members;

severing said annular members thereby forming individual elongate belts having two ends, a tread surface and an inner surface;

tapering both ends of individual belts to be joined to form the composite belt, each taper proceeding outwardly to each belt end from the tread surface to the inner surface of the belt, thereby forming an outwardly declining tapered surface at each belt end;

removing a portion of the inner surface at one tapered end of each individual belt to provide an overlapping surface for joining individual belts in end to end relation;

forming joints between a plurality of individual tire belts arrayed in overlapping end to end relation, each said joint being formed by chemically bonding an overlapping surface of one tapered belt end to an outwardly declining tapered surface of another belt and so that an elongate composite belt is formed.

2. A method as claimed in claim 1, including removing a portion of the inner surface at one tapered end of each individual belt to near an innermost reinforcing ply.

3. A method as claimed in claim 1, including removing a portion of the inner surface at one tapered end of each individual belt so that the overlapping surface terminates at a transversely extending abutting surface, and forming a transversely extending end surface at the other end of each individual belt sized so that said end surface may engage a transversely extending abutting surface of another individual belt when forming a joint.

4. A method as claimed in claim 1, including the additional step of forming joints between a plurality of individual tire belts using mechanical fasteners.

5. A method as claimed in claim 1, wherein the chemical bonding is achieved by an adhesive.

6. A method as claimed in claim 1, wherein the chemical bonding is achieved by vulcanization.

* * * * *